A. F. HALL.
Corn-Planter.
No. 218,732. Patented Aug. 19, 1879.
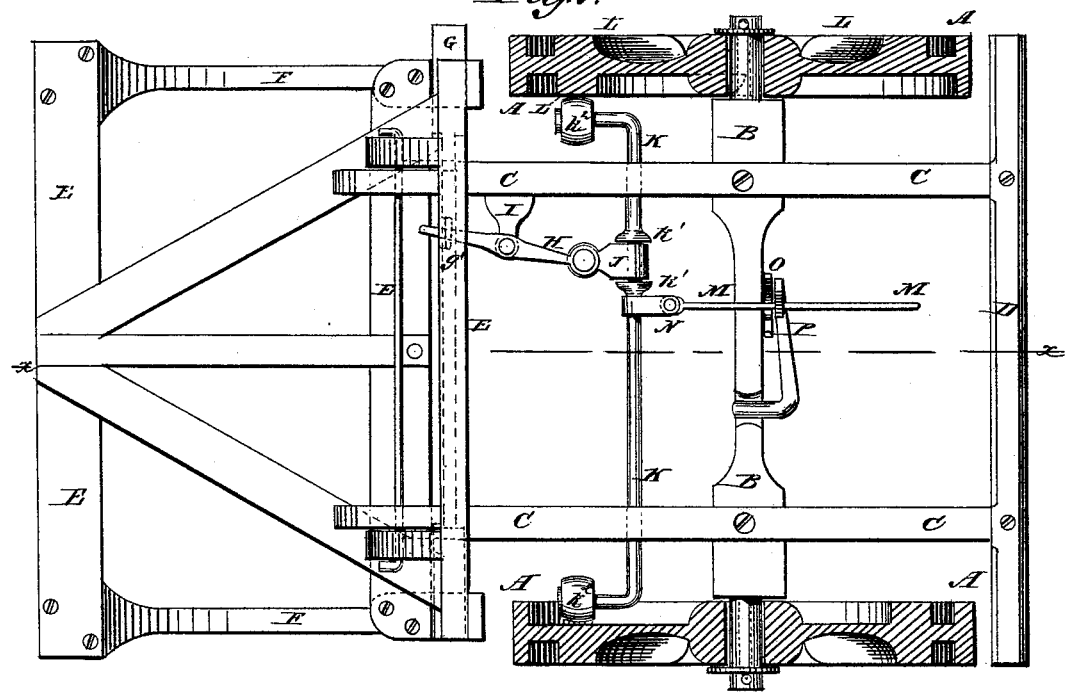
Fig. 1.
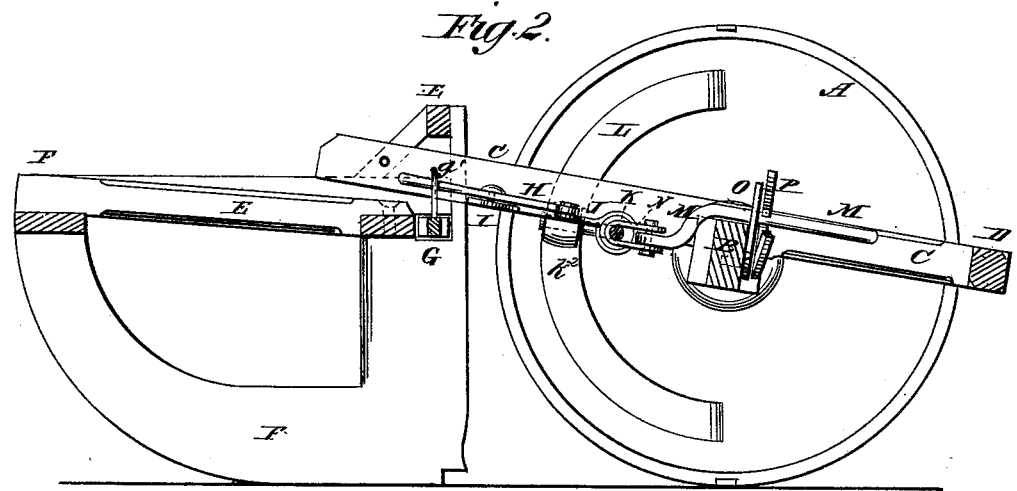
Fig. 2.
Fig. 3.
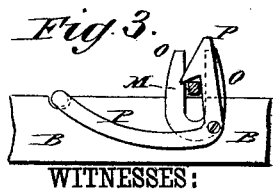
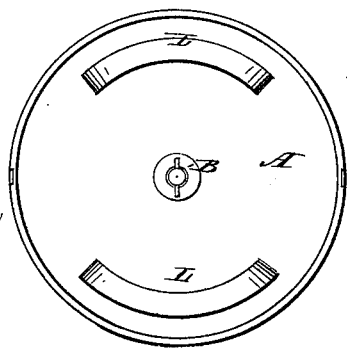
Fig. 4.
WITNESSES:
Francis McArdle
C. Sedgwick
INVENTOR:
A. F. Hall
BY Munn & Co
ATTORNEYS.

UNITED STATES PATENT OFFICE.

ALLEN F. HALL, OF ONARGA, ILLINOIS.

IMPROVEMENT IN CORN-PLANTERS.

Specification forming part of Letters Patent No. 218,732, dated August 19, 1879; application filed March 24, 1879.

*To all whom it may concern:*

Be it known that I, ALLEN FARGO HALL, of Onarga, in the county of Iroquois, and State of Illinois, have invented a new and useful Improvement in Corn-Planters, of which the following is a specification.

Figure 1 is a top view of a corn-planter to which my improvement has been applied. Fig. 2 is a vertical longitudinal section of the same, taken through the line $x\,x$, Fig. 1. Fig. 3 is a detail view of the self-fastening latch. Fig. 4 is a detail side view of a wheel, showing a modification of the cams.

Similar letters of reference indicate corresponding parts.

The object of this invention is to improve the construction of the corn-planter for which Letters Patent No. 197,549 were granted to me November 27, 1877, so as to make it simpler in construction, more easily operated, and more readily thrown into and out of gear.

The invention consists in combining a slide, loop-lever, rock-shaft, and wheel-cams; also, a flattened clasp, a lever, a notched plate, and a bent latch, all as hereinafter described.

A represents the drive-wheels, which revolve upon the journals of the axle B. To the axle B, near its ends, are attached two side bars, C, the rear ends of which are connected by a cross-bar, D. The forward ends of the side bars, C, are hinged to the forward frame, E, to which are attached the seed-hoppers and the runners F, that open channels to receive the seed.

G is the slide-bar that removes the seed from the seed-hoppers and drops it to the ground. To the slide-bar G is attached a keeper, $g'$, to receive the end of the lever H, which is pivoted to a support, I, attached to the side C. To the rear end of lever H, is pivoted a loop, J, which passes around the rod K, so that the said rod can turn in the said clamp or loop.

The loop J is kept from sliding longitudinally upon the rod K by collar $k^1$, formed upon or attached to it. The rod K slides and turns in bearings attached to the side bars, C. The ends of the rod K are bent at right angles, and upon the arms thus formed are placed rollers $k^2$, to roll upon the cams L, formed upon or attached to the inner sides of the wheels A. The cams L are made in half-ring shape, so as to bear alternately against the rollers $k^2$, to slide the rod K back and forth, and thus operate the sliding bar G to drop the seed.

If desired, the cams L may be made in quarter-ring shape, as shown in Fig. 4, and upon the outer side of the wheels A in Fig. 1. By this construction the rod K may be operated to drop the seed closer together or in drills.

If desired, the wheels A may be made with long cams L upon one side and short cams L upon the other side, so that the seed may be dropped in hills or drills by reversing the wheels.

M is a lever, the forward end of which is hinged to a clasp, N, which passes around the rod K. The part of the rod K that receives the clasp N is flattened, so that the said rod may be turned to throw the rollers $k^2$ into and out of gear with the cams L by operating the lever M.

To the axle B is attached a U-shaped bar or notched plate, O, to receive the lever M. The lever M is secured in the recess of the bar or plate O by a lever-latch, P, which is pivoted at its angle to the axle B, and its handle end is made so heavy or is so weighted as to keep the lever M fastened by its own weight. The handle end of the weighted latch P is bent at right angles to rest upon the axle B and prevent the engaging end of the said latch from being carried so far forward that it will not be pushed back by the lever M when being forced down into place to bring the rollers $k^2$ into gear with the cams L.

Having thus described my invention, I claim as new and desire to secure by Letters Patent—

1. The combination of the slide G, having keeper $g'$, the lever H, having loop J, and the rod or rock-shaft K, passing through said loop, journaled on bars C C, and having on its bent ends rolls, that work against wheel-cams L, as shown and described.

2. The combination, with rod K, of the flattened clasp N, the lever M, the notched plate O, and the bent latch P on axle, as and for the purpose specified.

ALLEN FARGO HALL.

Witnesses:
 A. K. DOE,
 B. H. DURHAM.